(12) United States Patent
Satake et al.

(10) Patent No.: US 7,658,992 B2
(45) Date of Patent: Feb. 9, 2010

(54) SURFACE PROTECTION FILM-ATTACHED OPTICAL FILM AND IMAGE DISPLAY

(75) Inventors: Masayuki Satake, Ibaraki (JP); Fumiaki Shirafuji, Ohtsu (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 184 days.

(21) Appl. No.: 11/597,049

(22) PCT Filed: May 11, 2005

(86) PCT No.: PCT/JP2005/008611
§ 371 (c)(1),
(2), (4) Date: Nov. 20, 2006

(87) PCT Pub. No.: WO2005/114270
PCT Pub. Date: Dec. 1, 2005

(65) Prior Publication Data
US 2007/0224415 A1 Sep. 27, 2007

(30) Foreign Application Priority Data
May 24, 2004 (JP) ............................. 2004-153187

(51) Int. Cl.
*B32B 7/12* (2006.01)
*C09J 201/00* (2006.01)
(52) U.S. Cl. ..................................... 428/341; 428/343
(58) Field of Classification Search ...................... None
See application file for complete search history.

(56) References Cited

U.S. PATENT DOCUMENTS 6,008,940 A 12/1999 Michihata et al.
6,407,788 B1 6/2002 Okumura et al.

(Continued)

FOREIGN PATENT DOCUMENTS

JP 3-55797 A 3/1991

(Continued)

OTHER PUBLICATIONS

Korean Office Action dated Apr. 1, 2008 (mailing date), issued in corresponding Korean Patent Application No. 10-2006-7018188.

(Continued)

*Primary Examiner*—Monique R Jackson
(74) *Attorney, Agent, or Firm*—Westerman, Hattori, Daniels & Adrian, LLP (57) ABSTRACT

A surface protection film-attached optical film of the invention comprises: an optical film; and a surface protection film that comprises a substrate film and a pressure-sensitive adhesive layer and is provided on the surface of, the optical film through the pressure-sensitive adhesive layer, wherein a surface of the optical film in contact with the pressure-sensitive adhesive layer is activated by treatment, and the pressure-sensitive adhesive layer of the surface protection film contains an ionic antistatic agent. The surface protection film-attached optical film can reduce the amount of peeling electrostatic charge which can be generated when the surface protection film is peeled off from the optical film, and can be free from the problem of optical film surface contamination after the surface protection film is peeled off.

4 Claims, 1 Drawing Sheet

U.S. PATENT DOCUMENTS

| | | | |
|---|---|---|---|
| 6,582,789 B1 * | 6/2003 | Sumi | 428/40.1 |
| 6,998,175 B2 | 2/2006 | Murata et al. | |

FOREIGN PATENT DOCUMENTS

| | | | |
|---|---|---|---|
| JP | 8-253755 A | 10/1996 |
| JP | 9-31145 A | 2/1997 |
| JP | 9-255932 A | 9/1997 |
| JP | 10-310618 A | 11/1998 |
| JP | 11-91038 A | 4/1999 |
| JP | 11-334785 A | 12/1999 |
| JP | 2001-49206 A | 2/2001 |
| JP | 2001-323228 A | 11/2001 |
| JP | 2003-195044 A | 7/2003 |
| KR | 10-0456046 BI | 10/1997 |
| KR | 2001-0051756 A | 6/2001 |
| KR | 2002-0047702 A | 6/2002 |
| WO | WO 9708260 A1 * | 3/1997 |

OTHER PUBLICATIONS

International Preliminary Report on Patentability of Corresponding International Patent Application No. PCT/JP2005/008611 mailed Mar. 1, 2007.

International Search Report of PCT/JP2005/008611, date of mailing Aug. 23, 2005.

Japanese Office Action dated Oct. 27, 2009, issued in corresponding Japanese Patent Apllication No. 2004-153187.

* cited by examiner

[FIG.1]

SURFACE PROTECTION FILM-ATTACHED OPTICAL FILM AND IMAGE DISPLAY

TECHNICAL FIELD

The invention relates to a surface protection film-attached optical film that includes an optical film and a protection film provided on the surface of the optical film. The invention also relates to an image display using the surface protection film-attached optical film, such as a liquid crystal display, an organic electro-luminescent display, and a plasma display panel. The optical film may be a polarizing plate, a retardation plate, an optical compensation film, a brightness enhancement film, a laminate thereof, or the like.

BACKGROUND ART

The image-forming mode of liquid crystal displays or the like requires polarizing elements to be placed on both sides of a liquid crystal cell, and generally polarizing plates are attached thereto. Besides polarizing plates, a variety of optical elements have been used for liquid crystal panels to improve display quality. For example, there are used retardation plates for prevention of coloring, viewing angle expansion films for improvement of the viewing angle of liquid crystal displays, and brightness enhancement films for enhancement of the contrast of displays. These films are generically called optical films.

A protection film is generally attached to the surface of these optical films such that the surface thereof will not be damaged or stained during the manufacturing process or transport until they reach customers. In some cases, such a surface protection film is peeled off after attached to an LCD or the like or is once peeled off, before the same or any other surface protection film is attached. Therefore, the surface protection film has a problem in which when it is peeled off, static electricity can be generated to destroy a circuit of an LCD panel or the like. It also has another problem in which it can have an influence on an array element (TFT driving element) inside an LCD panel, which can further have an influence on the liquid crystal orientation to induce defects. Such problems can occur not only when the surface protection film is peeled off but also when friction occurs between optical films by a manufacturing process or customer's operation.

It is proposed that antistatic properties be imparted to optical films such as polarizing plates in order to sufficiently prevent a malfunction of the liquid crystal display and electrostatic destruction of TFT driving elements or the like. For example, since protective films such as triacetylcellulose films are generally provided on both sides of a polarizer to form a polarizing plate, it is proposed that a triacetylcellulose film for use as a protective film for a polarizer be provided with an antistatic layer (Japanese Patent Application Laid-Open (JP-A) No. 11-90038). However, the case where an antistatic layer is formed on the triacetylcellulose film is not preferred, because the number of processes for forming the protective film can be increased so that the yield can be reduced.

It is also proposed that not only a pressure-sensitive adhesive layer but also an antistatic layer be provided to form a surface protection film for use in optical films. However, the case where the antistatic layer is provided to form the surface protection film is also not preferred, because the number of processes for forming the surface protection film can also be increased so that the yield can be reduced. It is also proposed that an antistatic effect be imparted to a pressure-sensitive adhesive tape itself by adding an antistatic agent to the pressure-sensitive adhesive layer of a general pressure-sensitive adhesive tape (JP-A No. 08-253755 and JP-A No. 09-255932). Such a pressure-sensitive adhesive tape can prevent electrostatic charge directly at a part that will be peeled off and could otherwise be electrically charged. However, the pressure-sensitive adhesive tape has a problem in which the antistatic agent can bleed out to stain the attached material. Since optical films are particularly sensitive to surface contamination, such a pressure-sensitive adhesive tape cannot be applied to surface protection films for use in optical films.

DISCLOSURE OF THE INVENTION

Problems to be Solved by the Invention

It is an object of the invention to provide a surface protection film-attached optical film that includes an optical film and a surface protection film provided on the surface of the optical film, can reduce the amount of peeling electrostatic charge which can be generated when the surface protection film is peeled off from the optical film, and can be free from the problem of optical film surface contamination after the surface protection film is peeled off.

It is another object of the invention to provide an image display using such a surface protection film-attached optical film.

Means for Solving the Problems

As a result of active investigations for solving the problems, the inventors have found the surface protection film-attached optical film described below and have completed the invention.

The present invention related to a surface protection film-attached optical film, comprising:

an optical film; and a surface protection film that comprises a substrate film and a pressure-sensitive adhesive layer and is provided on the surface of the optical film through the pressure-sensitive adhesive layer, wherein a surface of the optical film in contact with the pressure-sensitive adhesive layer is activated by treatment, and the pressure-sensitive adhesive layer of the surface protection film contains an ionic antistatic agent.

The ionic antistatic agent contained in the pressure-sensitive adhesive layer of the surface protection film can be transferred from the surface of the pressure-sensitive adhesive layer to the surface of the optical film so that peeling electrostatic charge can be prevented when the surface protection film is peeled off and that static electricity-induced defects can be prevented. If the amount of the antistatic agent added to the pressure-sensitive adhesive is increased, the antistatic agent can also bleed out from the pressure-sensitive adhesive in addition to the amount of the initially transferred antistatic agent so that the antistatic effect can be increased. However, if the amount of the transferred antistatic agent (the bleeding-out amount) becomes too large, the surface of the optical film can be significantly stained so that defective optical properties can be generated. Such an amount of the transferred antistatic agent can also cause changes or a reduction in adhesion. If the amount of the antistatic agent added to the pressure-sensitive adhesive is too small, the antistatic effect cannot be sufficiently obtained, although there will be no problem of contamination or any contamination can easily be controlled.

According to the invention, the pressure-sensitive adhesive layer of the surface protection film contains the antistatic agent, and the surface of the optical film is activated by treatment, so that a proper amount of the antistatic agent can be transferred even in the case where the amount of the antistatic agent added to the pressure-sensitive adhesive layer is relatively small. According to the invention, therefore, a proper amount of the antistatic agent can be efficiently transferred so that the potential contamination of the surface of the optical film can be controlled while the antistatic effect is imparted to the surface of the optical film. The amount of transfer of the antistatic agent can also be regulated so that changes or a reduction in adhesion can also be suppressed.

In the surface protection film-attached optical film, the surface of the optical film has been subjected to activation treatment for improving the bonding properties of the optical film surface. Such activation treatment is preferably chemical or physical treatment to oxidize the film surface, and specifically, such activation treatment is preferably saponification treatment or corona treatment.

In the surface protection film-attached optical film, the antistatic agent is preferably transferred in an amount of 0.00001 to 0.06 g/m$^2$ to the surface of the optical film when the surface protection film is peeled off.

In terms of the antistatic effect, the antistatic agent is preferably transferred in an amount of at least 0.00001 g/m$^2$, more preferably in an amount of at least 0.001 g/m$^2$, still more preferably in an amount of at least 0.001 g/m$^2$. In view of potential contamination, the antistatic agent is preferably transferred in an amount of at most 0.06 g/m$^2$, more preferably in an amount of at most 0.03 g/m$^2$, still more preferably in an amount of at most 0.01 g/m$^2$.

The invention is also related to an image display using the surface protection film-attached optical film.

BEST MODE FOR CARRYING OUT THE INVENTION

Figure 1:
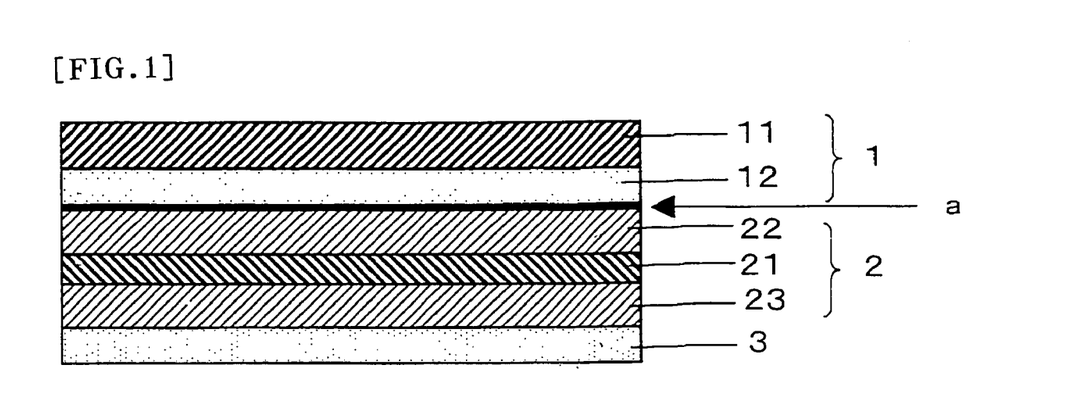
FIG. 1 is a cross-sectional view showing an example of the surface protection film-attached optical film according to the invention.

As shown in FIG. 1, the surface protection film-attached optical film of the invention includes an optical film 2 and a surface protection film 1 provided on the surface (a) of the optical film 2. The surface protection film 1 includes a substrate film 11 and a pressure-sensitive adhesive layer 12 and is provided on the surface (a) of the optical film 2 through the pressure-sensitive adhesive layer 12. The surface (a) of the optical film 2 is activated by treatment.

FIG. 1 shows an example where protective films 22 and 23 are provided on both sides of a polarizer 21 to form the optical film 2. The surface of the protective film 22 corresponds to the surface (a) of the optical film 2. As shown in FIG. 1, a pressure-sensitive adhesive layer 3 may be provided on the side of the optical film 2 where the surface protection film 1 is not provided.

Any base material that has been conventionally used for surface protection films may be used for the substrate film of the surface protection film. Isotropic or nearly-isotropic film materials are generally selected in terms of properties for see-through test or management of optical films. Examples of such film materials include transparent polymers such as polyester resins such as polyethylene terephthalate films, cellulose resins, acetate resins, polyethersulfone resins, polycarbonate resins, polyamide resins, polyimide resins, polyolefin resins, and acrylic resins. In particular, polyester resins are preferred. The substrate film may be made of a single film material or a laminate of two or more film materials. The substrate film may also be a product prepared by stretching the film. The substrate film generally has a thickness of at most 500 μm, preferably of 10 to 200 μm.

While any of acrylic, synthetic rubber-based, rubber-based, and silicone pressure-sensitive adhesives may be used to form the pressure-sensitive adhesive layer of the surface protection film, acrylic pressure-sensitive adhesives using acrylic polymers as the base polymer are preferred in terms of transparency, weather resistance, heat resistance, or the like.

Such acrylic polymers preferably have a weight average molecular weight of about 300,000 to about 2,500,000.

Various types of alkyl (meth)acylates may be used as the monomers for the acrylic polymers. Examples thereof include alkyl esters of (meth)acrylic acid (such as alkyl esters of 1 to 20 carbon atoms, such as methyl ester, ethyl ester, propyl ester, butyl ester, 2-ethylhexyl ester, isooctyl ester, isononyl ester, isodecyl ester, dodecyl ester, lauryl ester, tridecyl ester, pentadecyl ester, hexadecyl ester, heptadecyl ester, octadecyl ester, nonadecyl ester, and eicosyl ester). One or more of these may be used alone or in any combination.

A modifier may be used as a copolymerizable monomer together with the alkyl (meth)acrylate to modify the resulting acrylic polymer. Examples of such a modifier for use as a copolymerizable monomer include a carboxyl group-containing monomer such as (meth)acrylic acid and itaconic acid; a hydroxyl group-containing monomer such as hydroxyethyl (meth)acrylate and hydroxypropyl (meth)acrylate; an amide group-containing monomer such as N-methylolacrylamide; a cyano group-containing monomer such as (meth)acrylonitrile; an epoxy group-containing monomer such as glycidyl (meth)acrylate; vinyl esters such as vinyl acetate; and a styrene monomer such as styrene and a-methylstyrene.

Any polymerization method may be used to produce the acrylic polymers, and for example, known polymerization methods such as solution polymerization, emulsion polymerization, suspension polymerization, and UV polymerization may be used.

The pressure-sensitive adhesive contains an ionic antistatic agent. Examples of the ionic antistatic agent include cationic antistatic agents (such as quaternary ammonium salt type, phosphonium salt type, and sulfonium salt type), anionic antistatic agents (such as carboxylic acid type, sulfonate type, sulfate type, phosphate type, and phosphite type), and amphotericionic antistatic agents (such as sulfobetaine type, alkylbetaine type, and alkylimidazolium betaine type).

In particular, cationic antistatic agents, specifically quaternary ammonium salt type antistatic agents, are preferred. Examples of the quaternary ammonium salt type cationic antistatic agent include compounds represented by the general formula: $[(R^1,R^2,R^3,R^4)\text{---}N]^+X^-$, wherein $R^1$, $R^2$, $R^3$, and $R^4$ each independently represent an alkyl group of 1 to 18 carbon atoms or a hydrogen atom, provided that not all of $R^1$, $R^2$, $R^3$, and $R^4$ are a hydrogen atom, and X represents a base such as a halogen atom.

The amount of the ionic antistatic agent added to the pressure-sensitive adhesive is preferably at least about 0.1% by weight and less than about 2.5% by weight, more preferably from 0.5 to 1% by weight, based on the amount of the base polymer. If the amount is less than 0.1% by weight, the antistatic effect can tend to be insufficient. If the amount is 2.5% by weight or more, it can be difficult to control the antistatic effect and the contamination potential or the adhering performance, because of a large amount of the transferred antistatic agent.

The pressure-sensitive adhesive may also contain a crosslinking agent. Examples of the crosslinking agent include polyisocyanate compounds, polyamine compounds, melamine resins, urea resins, and epoxy resins. If necessary, a tackifier resin, a plasticizer, a filler, an antioxidant, an ultraviolet absorbing agent, a silane coupling agent, or the like may also appropriately be used for the pressure-sensitive adhesive.

Examples of the method for forming the pressure-sensitive adhesive layer include, but are not limited to, a method including the steps of applying the pressure-sensitive adhesive to a release liner, drying it and then transferring it to the substrate film (transfer method) and a method including the steps of applying the pressure-sensitive adhesive directly to the substrate film and drying it (direct application method). The thickness of the pressure-sensitive adhesive layer (the dry film thickness) is determined depending on the desired adhesive strength and generally from about 1 to about 100 μm, preferably from 5 to 50 μm.

While FIG. 1 only shows the substrate film 11 and the pressure-sensitive adhesive layer 12 for the surface protection film 1, the surface protection film 1 may further include a release layer subjected to treatment with a low-adhesion material, such as silicone treatment, long chain alkyl treatment and fluorine treatment, on the other side of the substrate film 11 opposite to the side where the pressure-sensitive adhesive layer 12 is provided.

The optical film for use in the surface protection film-attached optical film according to the invention may be of any type such as optical films for use in forming image displays such as liquid crystal displays.

The surface of the optical film to be brought into contact with the pressure-sensitive adhesive layer of the surface protection film is subjected to activation treatment before use. Examples of the activation treatment include saponification treatment, corona treatment, UV treatment, electron beam treatment, and plasma treatment. The activation treatment is preferably saponification treatment or corona treatment.

The saponification treatment may be performed using an aqueous alkali hydroxide solution such as an aqueous sodium or potassium hydroxide solution. The saponification treatment may be performed by dipping or allowing the surface of the optical film in or to pass through the aqueous alkali hydroxide solution. The concentration of the aqueous alkali hydroxide solution is preferably from about 2 to about 25% by weight. The concentration of the aqueous alkali hydroxide solution is preferably from 7 to 15% by weight in terms of easiness of control of the treatment time or the activated state. The treatment is preferably performed at about 20 to about 80° C., more preferably at 40 to 70° C., for about 5 to about 300 seconds, more preferably for 5 to 240 seconds.

While not particularly limited, the corona treatment is preferably performed at about 0.3 to about 20 kW on the optical film being fed at 2 to 40 m/minute, in view of the amount of heat load on the surface of the optical film.

The optical film may be a polarizing plate. A polarizing plate including a polarizer and a transparent protective film(s) provided on one or both sides of the polarizer is generally used. In such a polarizing plate, the surface of the protective film is subjected to the activation treatment.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed.

By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared on one side or both sides of the above-mentioned polarizer, with outstanding transparency, mechanical strength, heat stability, moisture cover property, isotropy, etc. may be preferable. For example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo- type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. The transparent protective film can be formed as a cured layer made of heat curing type or ultraviolet ray curing type resins, such as acryl based, urethane based, acryl urethane based, epoxy based, and silicone based.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protection film, which can be determined arbitrarily, is 1 to 500 μm, especially 5 to 200 μm in viewpoint of strength, work handling and thin layer.

The protective film is preferably as colorless as possible. Thus, a protective film is preferably used which has a film-thickness-direction retardation of −90 nm to +75 nm, wherein the retardation (Rth) is represented by the formula: Rth= $[(nx+ny)/(2-nz)]d$, wherein nx and ny are each a principal refractive index in the plane of the film, nz is a refractive index in the film-thickness direction, and d is the thickness of the film. If a protective film with such a thickness-direction retardation value (Rth) of −90 nm to +75 nm is used, coloring (optical coloring) of the polarizing plate can be almost avoided, which could otherwise be caused by any other protective film. The thickness-direction retardation (Rth) is more preferably from −80 nm to +60 nm, particularly preferably from −70 nm to +45 nm.

As the transparent protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. Isocyanate based adhesives, polyvinyl alcohol based adhesives, gelatin based adhesives, vinyl based latex based, aqueous polyester based adhesives, and etc. may be used for adhesion processing for the above-mentioned polarizers and the protective films.

As the opposite side of the polarizing-adhering surface of the transparent protective film, a film treated with a hard coat layer and various processing aiming for antireflection, sticking prevention and diffusion or anti glare may be used. If a treatment layer provided on the protective film is the surface of the polarizing plate, the treatment layer is subjected to the activated treatment.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the transparent protective film itself, and also they may be prepared as an optical layer different from the transparent protective film.

Further an optical film of the invention may be used as other optical layers, such as a reflective plate, a transflective plate, a retardation plate (a half wavelength plate and a quarter wavelength plate included), and a viewing angle compensation film, which may be used for formation of a liquid crystal display etc. . These are used in practice as a optical film, or as one layer or two layers or more of optical layers laminated with polarizing plate.

Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated transparent protective film. Moreover, a different type of plate with a fine concavo-convex structure on the surface obtained by mixing fine particle into the transparent protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the transparent protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the transparent protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

A description of the above-mentioned elliptically polarizing plate or circularly polarizing plate on which the retardation plate is laminated to the polarizing plates will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

As retardation plates, birefringence films obtained by uniaxial or biaxial stretching polymer materials, oriented films of liquid crystal polymers, and materials in which orientated layers of liquid crystal polymers are supported with films may be mentioned. Although a thickness of a retardation plate also is not especially limited, it is in general approximately from 20 to 150 μm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyaryl sulfones, polyvinyl alcohols, polyamides, polyimides, polyolefins, polyvinyl chlorides, cellulose type polymers, or bipolymers, terpolymers, graft copolymers, blended materials of the above-mentioned polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain structure, and polymers having mesogen parts comprising para-substituted ring compound units providing nematic orientation property as side chains via spacer parts comprising conjugated atomic groups may be mentioned. These liquid crystalline polymers, for example, is obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate include a retardation plate, a orientation film of a liquid crystal polymer, or an orientation layer of a liquid crystal polymer supported on a transparent substrate. Ordinary retardation plate is a polymer film having property that is processed by uniaxially stretching in the plane direction, while the viewing angle compensation retardation plate used is a bidirectional stretched film having birefringence property that is processed by biaxially stretching in the plane direction, or a film, which is controlled the refractive index in the thickness direction, that is processed by uniazially stretching in the plane direction and is processed by stretching in the thickness direction, and inclined orientation film. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, talking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the optical film including the polarizing plate, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned.

An adhesive layer may also be prepared on one side or both sides of a polarizing plate or an optical film as a layer in which pressure sensitive adhesives with different composition or different kind etc. are laminated together. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned optical film, and the adhesive layer etc., using a method of adding UV absorbents, such as salicylic acid ester type compounds, benzophenol type compounds, benzotriazol type compounds, cyano acrylate type compounds, and nickel complex salt type compounds.

The optical film of the invention is preferably used to form various types of image displays such as liquid crystal displays. Liquid crystal displays may be formed according to conventional techniques. Specifically, liquid crystal displays are generally formed by appropriately assembling a liquid crystal cell and the optical film and optionally other components such as a lighting system and incorporating a driving circuit according to any conventional technique. Any type of liquid crystal cell may also be used such as a TN type, an STN type and an type.

Suitable liquid crystal displays, such as liquid crystal display with which the optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. The optical film (including the polarizing plate) of the present is applied to the organic EL display. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

The invention is more specifically described by means of the examples below, which are not intended to limit the scope of the invention. It should be noted that "part or parts" and "%" are by weight in each example.

Comparative Example 1

(Preparation of Optical Film)

An 80 μm-thick polyvinyl alcohol film was stretched five times in an aqueous iodine solution (0.3% by weight in concentration) at 35° C. and then dried at 50° C. for four minutes to obtain a polarizer. An 80 μm-thick triacetylcellulose film was bonded to one side of the polarizer with a polyvinyl alcohol adhesive. An 80 μm-thick triacetylcellulose film with an antiglare layer (10 μm in thickness) formed thereon was bonded to the other side of the polarizer with a polyvinyl alcohol adhesive so that a 100 μm-thick polarizing plate was prepared. The antiglare layer was formed by a process including the steps of adding 10 parts of silica particles with an average particle size of 1.8 μm to an ultraviolet-curable resin composition composed of 100 parts of an ultraviolet-curable urethane acrylate monomer and 3 parts of a benzophenone photopolymerization initiator, further adding ethyl acetate as a viscosity modifier solvent thereto so as to adjust the solids content to 50%, mixing them with a high speed stirrer to form a mixture solution, applying the mixture solution, vaporizing the solvent, and then performing ultraviolet irradiation for curing. An acrylic pressure-sensitive adhesive was applied to the side opposite to the antiglare layer of the resulting polarizing plate and dried to form a 25 μm-thick pressure-sensitive adhesive layer so that a pressure-sensitive adhesive layer-attached polarizing plate was prepared.

(Preparation of Surface Protection Film)

<Preparation of Pressure-Sensitive Adhesive>

A 25% by weight ethyl acetate solution of an acrylic polymer of 2-ethylhexyl acrylate, methyl methacrylate and 2-hydroxyehtyl acrylate (68/29/3 in weight ratio, 400,000 in weight average molecular weight) was prepared. In terms of solids content, three parts by weight of trimethylolpropane-tolylene diisocyanate was added to 100 parts by weight of the acrylic polymer and mixed to obtain an acrylic pressure-sensitive adhesive composition.

The acrylic pressure-sensitive adhesive composition was applied to one side of a 38 μm-thick polyethylene terephthalate film so as to have a post-drying thickness of 15 μm and dried at 120° C. for two minutes to form a pressure-sensitive adhesive layer so that a surface protection film was obtained.

(Surface Protection Film-attached Optical Film)

A surface protection film-attached optical film was prepared by attaching the pressure-sensitive adhesive layer side of the surface protection film to the antiglare layer side of the polarizing plate.

Comparative Example 2

A surface protection film was prepared using the process of Comparative Examples 1 (Preparation of Surface Protection Film), except that based on the amount of the acrylic polymer, 1% by weight of an ionic antistatic agent of stearyl trimethyl ammonium chloride was added to form a pressure-sensitive adhesive. A surface protection film-attached optical film was prepared using the process of Comparative Example 1, except that the resulting surface protection film was alternatively used.

Comparative Example 3

A surface protection film was prepared using the process of Comparative Examples 1 (Preparation of Surface Protection Film), except that based on the amount of the acrylic polymer, 2.5% by weight of an ionic antistatic agent of stearyl trimethyl ammonium chloride was added to form a pressure-sensitive adhesive. A surface protection film-attached optical film was prepared using the process of Comparative Example 1, except that the resulting surface protection film was alternatively used.

Example 1

The antiglare layer side of the polarizing plate prepared in Comparative Example 1 was subjected to saponification treatment by dipping the side in an aqueous 10% sodium hydroxide solution at 65° C. for 30 seconds. The surface protection film prepared in Comparative Example 2 was used. A surface protection film-attached optical film was prepared by attaching the pressure-sensitive adhesive layer side of the surface protection film to the antiglare layer side of the polarizing plate.

Example 2

The antiglare layer side of the polarizing plate prepared in Comparative Example 1 was subjected to saponification treatment by dipping the side in an aqueous 10% sodium hydroxide solution at 65° C. for 120 seconds. The surface protection film prepared in Comparative Example 2 was used. A surface protection film-attached optical film was prepared by attaching the pressure-sensitive adhesive layer side of the surface protection film to the antiglare layer side of the polarizing plate.

Example 3

The antiglare layer side of the polarizing plate prepared in Comparative Example 1 was corona-treated at 0.7 kW and a line speed of 5 m/minute. The surface protection film prepared in Comparative Example 2 was used. A surface protection film-attached optical film was prepared by attaching the pressure-sensitive adhesive layer side of the surface protection film to the antiglare layer side of the polarizing plate.

Example 4

The antiglare layer side of the polarizing plate prepared in Comparative Example 1 was corona-treated at 1.4 kW and a line speed of 5 m/minute. The surface protection film prepared in Comparative Example 2 was used. A surface protection film-attached optical film was prepared by attaching the pressure-sensitive adhesive layer side of the surface protection film to the antiglare layer side of the polarizing plate.

The surface protection film-attached optical film prepared in each of the examples and the comparative examples was evaluated as described below. After the preparation, the surface protection film-attached optical film was subjected to moisture control under the atmosphere at 23° C. and 50% RH for 10 days and then used as a sample. The results are shown in Table 1.

[Measurement of Amount of Peeling Electrostatic Charge]

The sample was cut into a 70 mm×100 mm piece, which was attached to a non-alkali glass plate (0.7 mm in thickness) of the same size. Thereafter, the surface protection film was peeled off at a rate of 10 m/minute under the atmosphere at 23° C. and 50% RH. In this process, the maximum value of the peeling electrostatic charge generated at the center of the sample was defined as the amount of peeling electrostatic charge (kV). The amount of peeling electrostatic charge was measured using KSD-0103 manufactured by KASUGA ELECTRIC WORKS LTD., and the distance to the measurement point was 10 cm. The evaluation was performed according to the criteria below.

◎: less than 0.5 kV

○: less than 0.5 kV and less than 2 kV

Δ: not less than 2 kV and less than 2.5 kV

X: not less than 2.5 kV

[Amount of Transfer of Antistatic Agent]

The surface protection film was peeled off from the sample (70 mm×70 mm) with tweezers, and the side to which the protection film had been attached was washed with ultra-pure water. The liquid was collected and used as an analysis sample. The sample was subjected to ion chromatography (DX-500 manufactured by Dionex Corporation, Column: IonPac AG12A + AS12A manufactured by Dionex Corporation, Eluent: 2.7 mm-$Na_2CO_3$/0.3 mm-$NaHCO_3$), and the amount of the antistatic agent transferred to the polarizing plate was determined from the concentration of chloride ions in the sample. The measurement was performed twice (n=2), and the average value was defined as the amount of transfer ($g/m^2$).

[Adhesive Strength Test]

The sample was cut into a 50 mm-wide piece. While the polarizing plate side (the pressure-sensitive adhesive layer side) of the cut piece was fixed, the surface protection film was peeled from the polarizing plate at a pulling rate of 300 mm/minute and a pulling angle of 180° on a tensile tester. The force needed for peeling was defined as the adhesive strength (N/50 mm). The adhesive strength is preferably in the range of 0.01 to 2 N/50 mm, more preferably in the range of 0.05 to 1 N/50 mm, because in such a range, the surface protection function and the peelability can be well controlled.

TABLE 1

| | Amount of Peeling Electrostatic Charge (kV) | Amount of Transferred Antistatic Agent ($g/m^2$) | Adhesion (N/50 mm) |
|---|---|---|---|
| Comparative Example 1 | X | — | 0.32 |
| Comparative Example 2 | Δ | $1.00 \times 10^{-6}$ | 0.10 |
| Comparative Example 3 | ◎ | $2.05 \times 10^{1}$ | 0.006 |
| Example 1 | ◎ | $1.81 \times 10^{-3}$ | 0.46 |
| Example 2 | ◎ | $5.34 \times 10^{-2}$ | 0.62 |
| Example 3 | ○ | $5.84 \times 10^{-5}$ | 0.27 |
| Example 4 | ○ | $3.47 \times 10^{-4}$ | 0.42 |

Table 1 indicates that in each of the examples, the activation of the surface of the polarizing plate by saponification treatment or corona treatment allows control of the amount of transfer of the antistatic agent from the pressure-sensitive adhesive layer of the surface protection film so that the peeling electrostatic charge can be sufficiently reduced using a relatively small amount of the antistatic agent added to the pressure-sensitive adhesive layer and that the requirements for surface contamination or adhesion can also be satisfied. In contrast, as in Comparative Example 2, if the surface of the polarizing plate is not subjected to activation treatment and if the amount of the antistatic agent added to the pressure-sensitive adhesive layer of the surface protection film is relatively small as in the example, the amount of peeling electrostatic charge will be relatively large. As in Comparative Example 3, if the surface of the polarizing plate is not subjected to activation treatment and if the amount of the antistatic agent added to the pressure-sensitive adhesive layer of the surface protection film is relatively large, the amount of peeling electrostatic charge can be relatively small, but the amount of transfer of the antistatic agent can be relatively large so that the problem of potential contamination cannot be controlled, and the adhering properties can also be difficult to regulate.

INDUSTRIAL APPLICABILITY

The surface protection film-attached optical film of the invention is suitable for use in image displays such as liquid crystal displays, organic electro-luminescent displays and plasma display panels.

The invention claimed is:

1. A surface protection film-attached optical film, comprising:
    an optical film including a polarizer; and
    a surface protection film that comprises a substrate film and a pressure-sensitive adhesive layer and is provided on the surface of the optical film through the pressure-sensitive adhesive layer, wherein
    a surface of the optical film in contact with the pressure-sensitive adhesive layer is activated by treatment, and
    the pressure-sensitive adhesive layer of the surface protection film contains an ionic antistatic agent,
    wherein the antistatic agent is transferred in an amount of 0.00001 to 0.06 $g/m^2$ to the surface of the optical film when the surface protection film is peeled off.

2. The surface protection film-attached optical film according to claim 1, wherein the surface of the optical film is activated by saponification treatment or corona treatment.

3. An image display, comprising the surface protection film-attached optical film according to claim 1.

4. An image display, comprising the surface protection film-attached optical film according to claim 2.

* * * * *